US007089305B2

(12) United States Patent
Bates et al.

(10) Patent No.: US 7,089,305 B2
(45) Date of Patent: Aug. 8, 2006

(54) CONDITIONAL PROMOTION OF BOOKMARKS

(75) Inventors: Cary L. Bates, Rochester, MN (US); Gilford F. Martino, Endwell, NY (US); John M. Santosuosso, Rochester, MN (US); Vincent T. Timon, III, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 09/963,144

(22) Filed: Sep. 25, 2001

(65) Prior Publication Data

US 2003/0074415 A1  Apr. 17, 2003

(51) Int. Cl.
*G06F 15/173* (2006.01)

(52) U.S. Cl. ............... 709/224; 709/203; 709/217; 709/245

(58) Field of Classification Search ........ 709/217–219, 709/201–203, 224, 245; 707/3; 715/514
See application file for complete search history.

(56) References Cited

U.S. PATENT DOCUMENTS

| | | | | |
|---|---|---|---|---|
| 5,799,318 | A * | 8/1998 | Cardinal et al. ............ 707/101 |
| 5,813,007 | A * | 9/1998 | Nielsen ....................... 707/10 |
| 5,860,071 | A * | 1/1999 | Ball et al. .................... 707/100 |
| 5,961,590 | A * | 10/1999 | Mendez et al. ............. 709/206 |
| 5,978,828 | A * | 11/1999 | Greer et al. ................ 709/224 |
| 6,023,723 | A * | 2/2000 | McCormick et al. ....... 709/206 |
| 6,029,175 | A * | 2/2000 | Chow et al. ............ 707/104.1 |
| 6,041,360 | A * | 3/2000 | Himmel et al. ............ 709/245 |
| 6,088,717 | A | 7/2000 | Reed et al. |
| 6,100,890 | A | 8/2000 | Bates et al. ................ 345/357 |
| 6,184,886 | B1 | 2/2001 | Bates et al. ................ 345/357 |
| 6,314,439 | B1 | 11/2001 | Bates et al. ................ 707/513 |
| 6,460,038 | B1 * | 10/2002 | Khan et al. .................. 707/10 |
| 6,549,905 | B1 * | 4/2003 | Kim et al. ..................... 707/10 |
| 6,557,015 | B1 * | 4/2003 | Bates et al. ............. 715/501.1 |
| 6,631,369 | B1 * | 10/2003 | Meyerzon et al. ............. 707/4 |
| 6,751,777 | B1 * | 6/2004 | Bates et al. ............. 715/501.1 |
| 6,832,350 | B1 * | 12/2004 | Bates et al. ............. 715/501.1 |
| 6,961,751 | B1 * | 11/2005 | Bates et al. ................ 709/203 |
| 2002/0143932 | A1 * | 10/2002 | Quintero et al. ........... 709/224 |

OTHER PUBLICATIONS

Tracking and Viewing Changes on the Web, Fred Douglis and Thomas Ball, AT&T Bell Laboratories, 1996 USENIX Technical Conference.*

(Continued)

*Primary Examiner*—Dung C. Dinh
*Assistant Examiner*—Philip S. Scuderi
(74) *Attorney, Agent, or Firm*—Schmeiser, Olsen & Watts, LLP

(57) ABSTRACT

A method and system for organizing bookmarks. A bookmark structure includes a main bookmark list and at least one bookmark folder. A bookmark search list, which includes at least one bookmark in the bookmark structure, is generated. Software is executed, wherein the software searches each bookmark on the bookmark search list through depth N ($N \geq 0$). The searching determines whether the bookmark satisfies an upgrade condition. The upgrade condition includes a boolean text expression and may also include at least one of: a client visitation condition, a general visitation condition, a bookmark existence condition, a content-type condition, a URL-age condition, and a Top-Level-Domain (TLD) condition. If the searching determines that the bookmark satisfies the upgrade condition and that the bookmark is not in the special bookmark location, then the bookmark is moved to the special bookmark location.

72 Claims, 10 Drawing Sheets

OTHER PUBLICATIONS

Change the Number of Recent Documents to Display, "http://www.winguides.com/registry/display.php/828/".*

OL97: An Overview of Archive and AutoArchive, "http://support.microsoft.com/kb/239704".*

FirstFloor Smart Bookmarks 3.0 Data Sheet, Jan. 14, 1998, http://web.archive.org/web/19980114190953/www.firstfloor.com/datasheet/sb30data.html.*

Safari Examples, Aug. 28, 1997,http://safariexamples.informit.com/0789713993/books/ie3/.*

Linux Guide, May 5, 1999, http://www.ma.utexas.edu/math-lab/linux.html.*

Patent Application RO998-079; Bates, et al; U.S. Appl. No. 09/156,843, "Apparatus, Program Product and Method Utilizing a Document Trail to Navigate Between Hypertext Documents", filed Sep. 18, 1998.

Patent Application RO998-080; Bates, et al; U.S. Appl. No. 09/163,643, Organizing Hypertext Document Bookmarks by Mutual Affinity;, filed Sep. 30, 1998.

Patent Application RO998-082; Bates, et al; U.S. Appl. No. 09/174,952, "Multi-Target Links for Navigating Between Hypertext Documents and the Like", filed Oct. 19, 1998.

Patent Application RO999-226; Bates,et al; U.S. Appl. No. 09/563,271, "Apparatus and Method for Processing Bookmark Events for a Web Page", filed May 3, 2000.

Patent Application ROC920000071; Bates, et al; U.S. Appl. No. 09/583,700, Method, Apparatus, and Article of Manufacture for Providing Enhanced Bookmarking Features for a Heterogeneous Environment, filed May 31, 2000.

* cited by examiner

Sample Contents of Main Bookmark List or Bookmark Folder

☐ Invest
☒ http://www.jerryeden.com/ltr/
☐ Local
☐ Forms
☐ Law
☒ http://www.altavista.com/
☒ http://www.business2.com/articles/web/0,1653,12431,FF.html?ref=nav5
☐ Consumer
☐ Vehicles
☐ Electronics
☒ http://www.picklepower.com
☒ http://www.chips.ibm.com/
☒ http://www.legal.gsa.gov/
☒ http://www.chips.ibm.com/
☒ http://www.ihsl.com/naturallyspeaking/
☒ http://www.mirriamwebster.com/lighter/lighter.htm
☒ http://www.nysba.org/
☒ http://www.windowsmedia.com/radiotuner/default.asp
☒ http://www.aipla.com/html/publication.html
☐ Sports

*FIG. 4*

Table Relating Links To Web Pages for *FIG. 5*

| Link | On Web Page | Links To Web Page |
|------|-------------|-------------------|
| 81 | 101 | 102 |
| 82 | 101 | 103 |
| 83 | 101 | 104 |
| 84 | 102 | 105 |
| 85 | 102 | 106 |
| 86 | 103 | 107 |
| 87 | 104 | 108 |
| 88 | 104 | 109 |
| 89 | 105 | 110 |
| 90 | 106 | 111 |
| 91 | 107 | 112 |
| 92 | 107 | 113 |
| 93 | 108 | 114 |
| 94 | 108 | 115 |

*FIG. 6*

Example of a Bookmark Structure Showing Bookmarks Selected To Be Searched

Bookmark Search List Derived From *FIG. 8*

| B02, B05, B06, B07, B021, B022, B023, B031, B032, B033, B034, B0113 |

*FIG. 9*

Table of Upgrade Condition

| Upgrade Condition | Condition Relates To: |
|---|---|
| Text | Page content matches boolean text expression |
| Client visitation condition | Client visitation of page (time constraint) |
| General visitation condition | General visitation of page (time constraint) |
| Bookmark existence condition | Existence of bookmark in bookmark folder (time constraint) |
| Content-type condition | Content type of page |
| URL-age condition | Age or creation date of URL page |
| Top-Level-Domain (TDL) condition | TDL type (.com, .net, .org, etc.) |

*FIG. 10*

CONDITIONAL PROMOTION OF BOOKMARKS

BACKGROUND OF THE INVENTION

1. Technical Field

The present invention relates to a method and system for organizing and managing bookmarks to browsed pages of information.

2. Related Art

The Internet has made available to a computer user millions of pages of information in a server-client architecture in which the computer user's computer is the client and a remote computer is the server. The server is typically made available to the Internet client through an interface called an Internet Service Provider (e.g., America On-Line, Prodigy, CompuServe, etc.) which communicates with the user over a communications medium such as telephone lines, cable, etc. The Internet Service Provider functions as a conduit through which the client communicates with many different servers. In order for the server and the client to communicate, the client computer includes a computer program called a "browser" (e.g., Internet Explorer, Netscape Navigator, etc.). The browser communicates the client's request to a server and formats the responses from the server for browsing (i.e., viewing) by the user.

The server receives a request for information from the client, processes the request, and returns the requested information to the client. The information returned from the server to the client is an image of "page" or a "Web page." A page is identified by a web address called a Uniform Resource Locator (URL) which may be very lengthy. An example of a URL is "http://www-1.ibm.com/business-center/us/smbusapub.nsf/detailcontacts/SBCenter59BB". With current technology, a user may access many pages over brief periods of time. For example, it is not uncommon for a user to access 20 pages or more in 1 or 2 minutes. Because a URL is awkward for a user to remember and enter, the browser may include a "bookmark" or "favorites" capability of allowing a user to save a URL of a page while the user is visiting the page. The URL or page thus saved is called a "bookmark." However, the user may generate many such bookmarks and is thus faced with a need to organize and manage the bookmarks so generated.

An Internet user may be interested in linking to particular Internet web sites only when the web site pages includes certain desired information. These pages are often bookmarked so that the user can access these pages frequently to determine if the desired information is present on these pages. For example, some users will view a financial page only if one of several stocks they hold is being discussed; otherwise these users have no interest in these pages. Checking all pages of this type can be a long process and often pages of interest are missed because of the long time that it takes for the user to load the pages and read the pages. Accordingly, there is a need a method and system for organizing and managing bookmarks of URL's (or pages) that have been saved.

SUMMARY OF THE INVENTION

The present invention provides a method for organizing bookmarks, comprising:

searching each bookmark on a bookmark search list through depth N, wherein N is a non-negative integer, wherein the bookmark search list includes at least one bookmark in a bookmark structure, and wherein the bookmark structure includes a main bookmark list and at least one bookmark folder;

determining from the searching whether the bookmark satisfies an upgrade condition that includes a boolean text expression; and if the determining determines that the bookmark satisfies the upgrade condition and if the bookmark is not in a special bookmark location within the bookmark structure, then moving the bookmark to the special bookmark location.

The present invention provides a method for organizing bookmarks, comprising:

generating a bookmark search list that includes at least one bookmark from a bookmark structure that includes a main bookmark list and at least one bookmark folder; and triggering execution of software that:

searches each bookmark on the bookmark search list through depth N, wherein N is a non-negative integer, determines from the searching whether the bookmark satisfies an upgrade condition that includes a boolean text expression, and moves the bookmark to a special bookmark location within the bookmark structure if the software determines that the bookmark satisfies the upgrade condition and if the bookmark is not in the special bookmark location.

The present invention provides a computer system for organizing bookmarks, said computer system comprising a computer code adapted to:

search each bookmark on a bookmark search list through depth N, wherein N is a non-negative integer, wherein the bookmark search list includes at least one bookmark in a bookmark structure, and wherein the bookmark structure includes a main bookmark list and at least one bookmark folder;

determine from the searching whether the bookmark satisfies an upgrade condition that includes a boolean text expression; and move the bookmark to a special bookmark location within the bookmark structure if the computer code determines that the bookmark satisfies the upgrade condition and if the bookmark is not in the special bookmark location, wherein the special bookmark location is selected from the group consisting of the main bookmark list and a special bookmark folder of the at least one bookmark folder.

The present invention provides a computer system for organizing bookmarks, said computer system comprising a computer code adapted to:

generate a bookmark search list that includes at least one bookmark from a bookmark structure, wherein the bookmark structure includes a main bookmark list and at least one bookmark folder; and trigger execution of software that:

searches each bookmark on the bookmark search list through depth N, wherein N is a non-negative integer, determines from the searching whether the bookmark satisfies an upgrade condition that includes a boolean text expression, and moves the bookmark to a special bookmark location within the bookmark structure if the computer code determines that the bookmark satisfies the upgrade condition and if the bookmark is not in the special bookmark location.

The present invention provides a bookmark structure in a computer environment, comprising:

a main bookmark list stored in the computer environment;

at least one bookmark folder stored in the computer environment; and a special bookmark location in the computer environment within the bookmark structure, wherein the special bookmark location is adapted to receive a bookmark having been searched through depth N and found from the search to satisfy an upgrade condition that includes a boolean text expression, and wherein N is a non-negative integer.

The present invention provides a system for organizing bookmarks, comprising:

means for searching each bookmark on a bookmark search list through depth N, wherein N is a non-negative integer, wherein the bookmark search list includes at least one bookmark in a bookmark structure, and wherein the bookmark structure includes a main bookmark list and at least one bookmark folder;

means for determining from the searching whether the bookmark satisfies an upgrade condition that includes a boolean text expression; and means for moving the bookmark to a special bookmark location if the bookmark satisfies the upgrade condition and if the bookmark is not in the special bookmark location.

The present invention provides a means for generating a bookmark search list that includes at least one bookmark from a bookmark structure that includes a main bookmark list and at least one bookmark folder; and means for triggering execution of software that:

searches each bookmark on the bookmark search list through depth N, wherein N is a non-negative integer, determines from the searching whether the bookmark satisfies an upgrade condition that includes a boolean text expression, and moves the bookmark to a special bookmark location within the bookmark structure if the software determines that the bookmark satisfies the upgrade condition and if the bookmark is not in the special bookmark location.

The present invention provides a method and system for organizing and managing bookmarks of URL's (or pages) that have been saved.

BRIEF DESCRIPTION OF THE DRAWINGS

FIG. 4 depicts an example of content in a main bookmark list or a bookmark folder, in accordance with embodiments of the present invention.

FIG. 6 is a table relating links to web pages for FIG. 5.

FIG. 9 depicts a bookmark search list derived from FIG. 8, in accordance with embodiments of the present invention.

FIG. 10 is a table of upgrade conditions, in accordance with embodiments of the present invention.

DETAILED DESCRIPTION OF THE INVENTION

The present invention recognizes that an Internet user may be interested in linking to particular Internet web sites only when the web site pages includes certain desired information. These pages are often bookmarked so that the user can access these pages frequently to determine if the desired information is present on these pages. For example, some users will view a financial page only if one of several stocks they hold is being discussed; otherwise these users have no interest in these pages. Checking all pages of this type can be a long process and often pages of interest are missed because of the long time that it takes for the user to load the pages and read the pages.

The present invention allows the user to put such pages of potential interest into one or more bookmark folders. These pages, called bookmarks, remain in such bookmark folders if they are found not to satisfy a particular condition, called an "upgrade condition," but these bookmarks will be upgraded or promoted to a special bookmark location (e.g., a special bookmark folder) upon satisfying the upgrade condition. The special bookmark location is where the user will notice such upgraded bookmarks and know that such upgraded bookmarks contain information of interest to the user. The present invention allows the upgrade condition to be associated with an entire bookmark folder, or with particular bookmarks within the bookmark folder.

To determine whether the bookmarks to be tested satisfy the upgrade condition, a browser at the client computer could download bookmark pages and test the bookmark pages against the upgrade condition in the background. Alternatively, a server at a dedicated web site could test the bookmark pages against the upgrade condition at a location that is remote to the client computer, such as a server at a dedicated web site.

Thus, the present invention enables a software provider that includes, or has access to, a search engine to test particular bookmarks against an upgrade conditions, and return information to the browser as to which bookmarks satisfy the upgrade condition. As a result of such testing, the bookmarks satisfying the upgrade condition could be upgraded to the special bookmark location, while the bookmarks not satisfying the upgrade condition could remain in their current bookmark folders. Accordingly, the following discussion of FIGS. 1–11 describes embodiments of the present invention.

Figure 1:
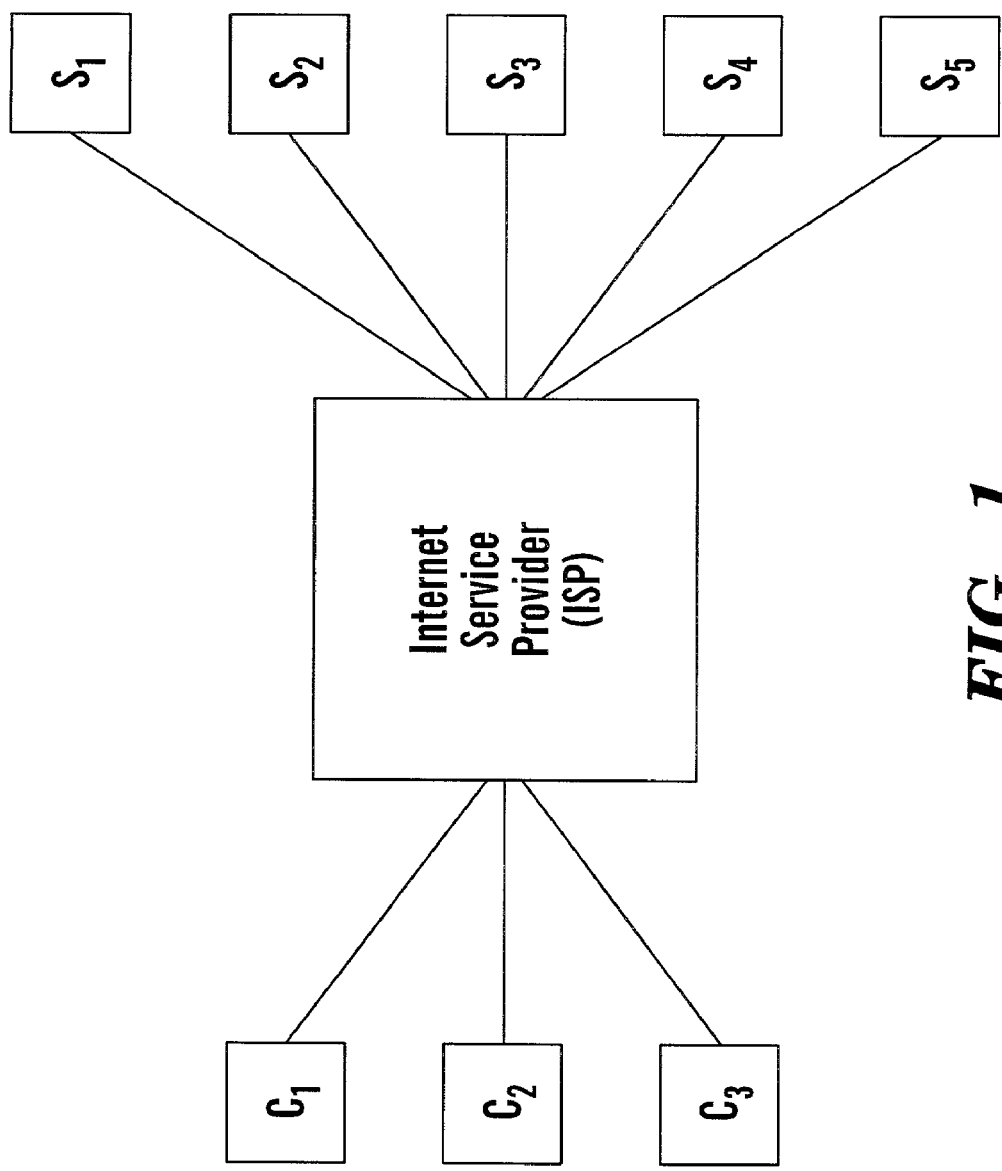
FIG. 1 is a block diagram of an Internet client-server architecture, in accordance with embodiments of the present invention.

FIG. 1 is a block diagram of an Internet client-server architecture, in accordance with embodiments of the present invention. In FIG. 1, an Internet Service Provider (ISP) provides Internet service to clients $C_1$, $C_2$, and $C_3$. The Internet service includes access to servers $S_1$, $S_2$, $S_3$, $S_4$, and $S_5$ representing 5 distinct web sites.

Figure 2:
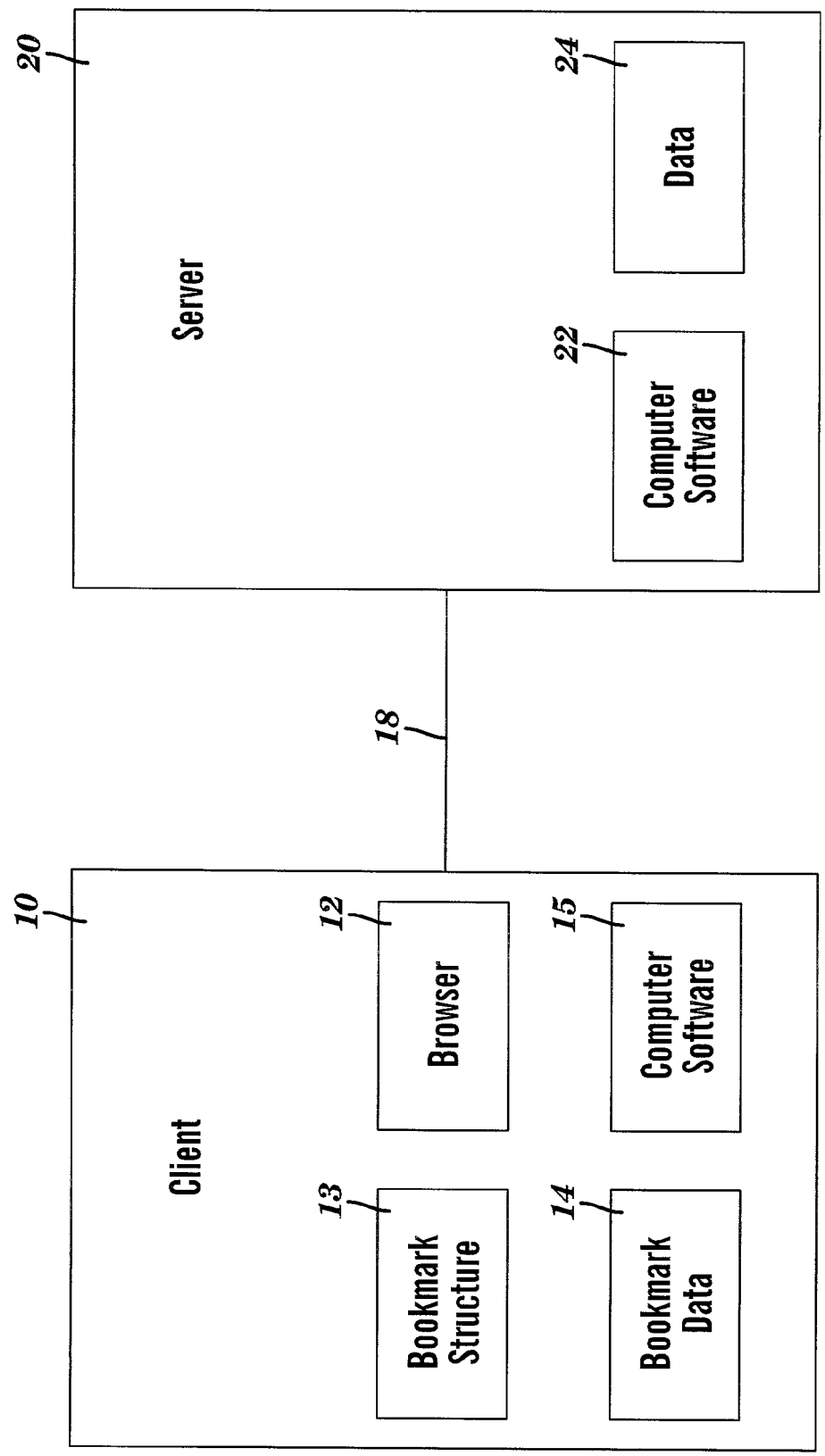
FIG. 2 depicts a client and server of FIG. 1 in increased detail including a bookmark structure at the client, in accordance with embodiments of the present invention.

FIG. 2 depicts a client 10 connected to a server 20 through an interface 18. The client 10 may represent any of the clients $C_1$, $C_2$, and $C_3$ of FIG. 1, and the server 20 may represent any of the servers $S_1$, $S_2$, $S_3$, $S_4$, and $S_5$ of FIG. 1. The interface 18, which is a communication interface using a communication medium such as telephones lines or cable, may include the ISP of FIG. 1. The client 10 includes a computer or computer system having a browser 12, a bookmark structure 13, bookmark data 14, and a computer software 15. The server 20 includes a computer or computer system having a computer software 22 and data 24. The browser 12 communicates requests of the client 10 to the server 20 and formats responses received from the server 20 for viewing at the client 10. The bookmark structure 13, bookmark data 14, computer software 15, computer software 22, and data 24 are used to implement bookmark organization and management in accordance with the present invention, as will be explained infra.

Figure 3:
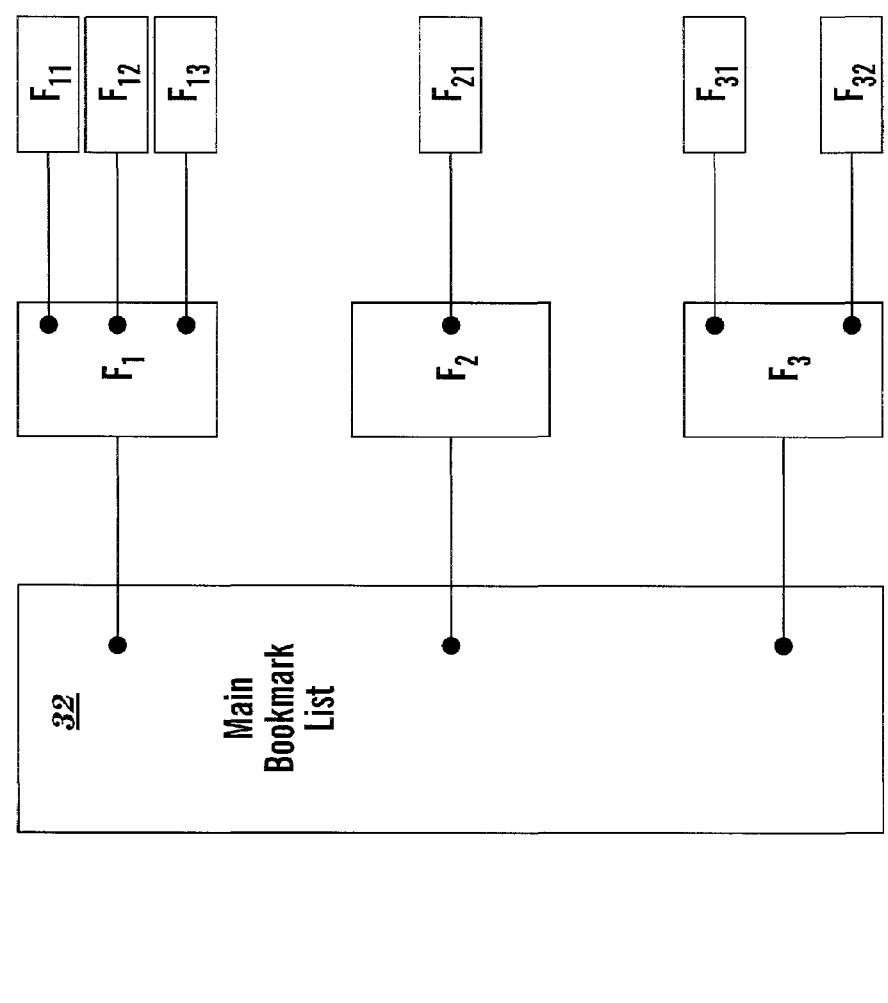
FIG. 3 depicts an example of the bookmark structure of FIG. 2, in accordance with embodiments of the present invention.

FIG. 3 depicts a bookmark structure 30, which is an example of the bookmark structure 13 of FIG. 2, in accordance with embodiments of the present invention. The bookmark structure 30 includes a main bookmark list 32 and bookmark folders in a hierarchical structure as follows. The main bookmark list 32 is itself a bookmark folder and includes other bookmark folders $F_1$, $F_2$, and $F_3$. The bookmark folder $F_1$ includes bookmark folders $F_{11}$, $F_{12}$, and $F_{13}$. The bookmark folder $F_2$ includes bookmark folder $F_{21}$. The bookmark folder $F_3$ includes bookmark folders $F_{31}$ and $F_{32}$. The main bookmark list 32 and each of the preceding bookmark folders ($F_1$, $F_2$, $F_3$, $F_{11}$, $F_{12}$, $F_{13}$, $F_{21}$, $F_{31}$, $F_{32}$) may each store other bookmark folders (as shown in FIG. 3). Besides storing or linking to other bookmark folders, the main bookmark list 32 and each bookmark folder ($F_1$, $F_2$, etc.) stores bookmarks as will be explained infra in conjunction with FIG. 4. A "bookmark" (also called a "favorite") is a Uniform Resource Locator (URL) that constitutes a web address of a web page of the Internet.

FIG. 4 depicts an example of content (i.e., bookmark folders and bookmarks) in a main bookmark list or in a bookmark folder, in accordance with embodiments of the present invention. In FIG. 4, the symbol □ denotes a bookmark folder (e.g., "Invest", "Local", "Forms", etc.), and the symbol ⊠ denotes a bookmark (e.g., "http://wwwjerryeden.com/ltr/", "//www.mirriamwebster.com/lighter/lighter.htm", etc.). A user may select a bookmark folder to link to by, inter alia, clicking on □. A user may select a bookmark to link to by, inter alia, clicking on ⊠. To clarify the relationship between FIGS. 3 and 4, it should be noted for example that in FIG. 3, the bookmark folder $F_1$ includes links denoted by □ (not shown in FIG. 3) that may be clicked to link to bookmark folders $F_{11}$, $F_{12}$, and $F_{13}$. Additionally, the bookmark folder $F_1$ may include bookmarks denoted by ⊠ (not shown in FIG. 3) that may be clicked to link to web sites having the URL of such bookmarks. The URL associated with each bookmark appearing in FIG. 4 links to a web page on a web site of the Internet.

Figure 5:
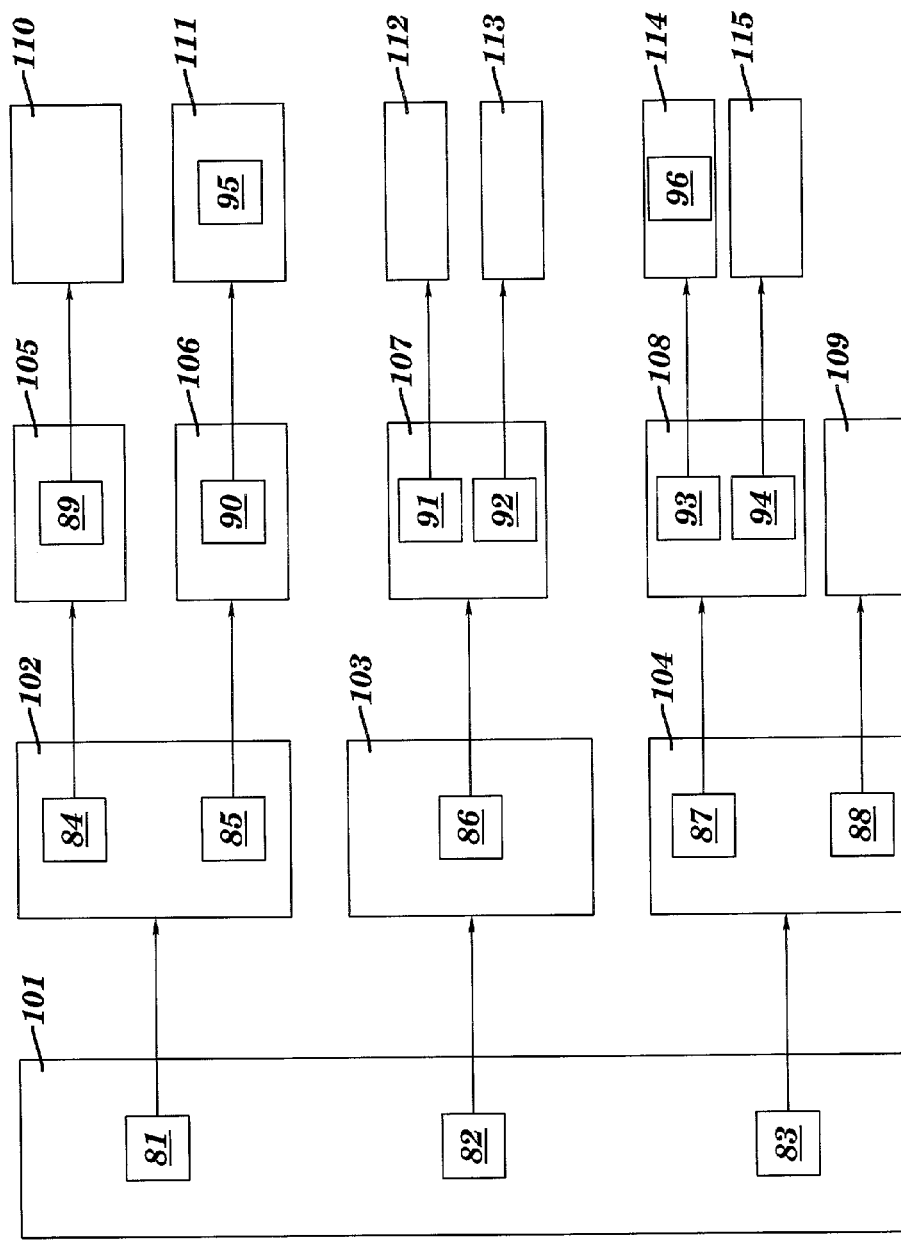
FIG. 5 depicts an example of a linking to web pages, in accordance with embodiments of the present invention.

FIG. 5 depicts an example of a linking to web pages, in accordance with embodiments of the present invention. Reference numerals 101–115 denote web pages and reference numerals 81–96 denote "links" within web pages 101–115 as shown. A link represents a URL that points to a web page. For example, link 81 in web page 101 points to web page 102, link 84 in web page 102 points to web page 105, and link 89 in web page 105 points to web page 110. A bookmark in the bookmark structure 30 of FIG. 3 points to a web page such as one of the web pages 101–115 in FIG. 5. A depth N (Nm0) of a given bookmark denotes all web pages N levels forward from the given bookmark. For example if a bookmark B1 points to web page 101 of FIG. 5, then: depth 0 (i.e., N=0) of bookmark B1 denotes web page 101; depth 1 (i.e., N=1) of bookmark B1 denotes web pages 102–104 through links 81–83; depth 2 (i.e., N=2) of bookmark B1 denotes web pages 105–109 through links 84–88; and depth 3 (i.e., N=3) of bookmark B1 denotes web pages 110–115 through links 89–94. As another example, if a bookmark B2 points to web page 102 of FIG. 5, then: depth 0 (i.e., N=0) of bookmark B2 denotes web pages 102–104; depth 1 (i.e., N=1) of bookmark B2 denotes web pages 105–109 through links 84–88; and depth 2 (i.e., N=2) of bookmark B2 denotes web pages 110–115 through links 89–94. FIG. 6 summarizes the relationship between links and web pages of FIG. 5.

Figure 7:
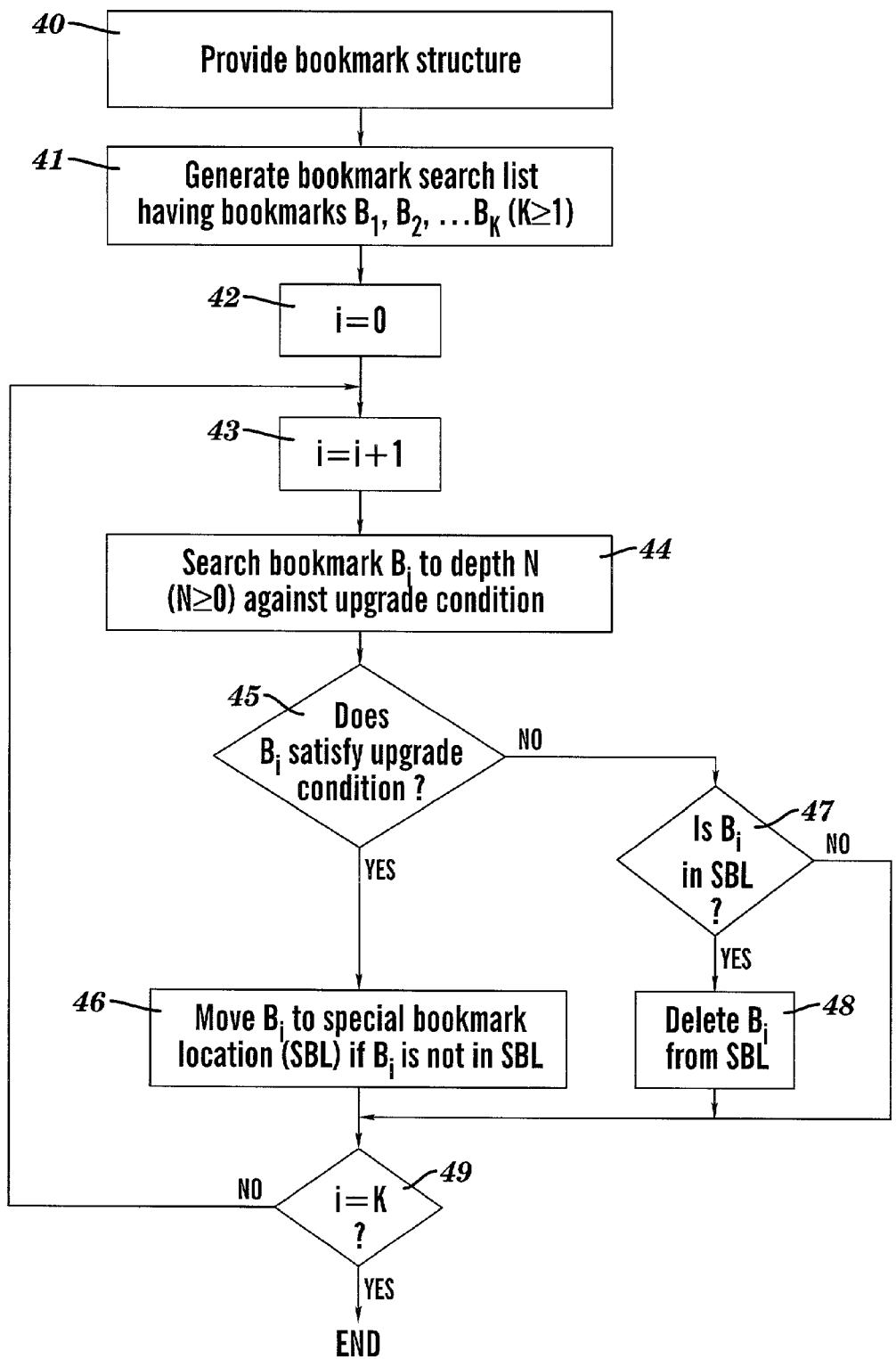
FIG. 7 is a flow chart of conditional bookmark software, in accordance with embodiments of the present invention.

FIG. 7 is a flow chart of conditional bookmark software (or of a computer code or an algorithm relating to the conditional bookmark software), in accordance with embodiments of the present invention. Step 40 of FIG. 7 provides a bookmark structure such as, inter alia, the bookmark structure 30 of FIG. 3 (described supra) which includes a main bookmark list and bookmark folders. Step 41 generates a bookmark search list of K bookmarks $B_1$, $B_2$, ..., $B_K$ ($K \geq 1$), as illustrated in FIGS. 8 and 9.

Figure 8:
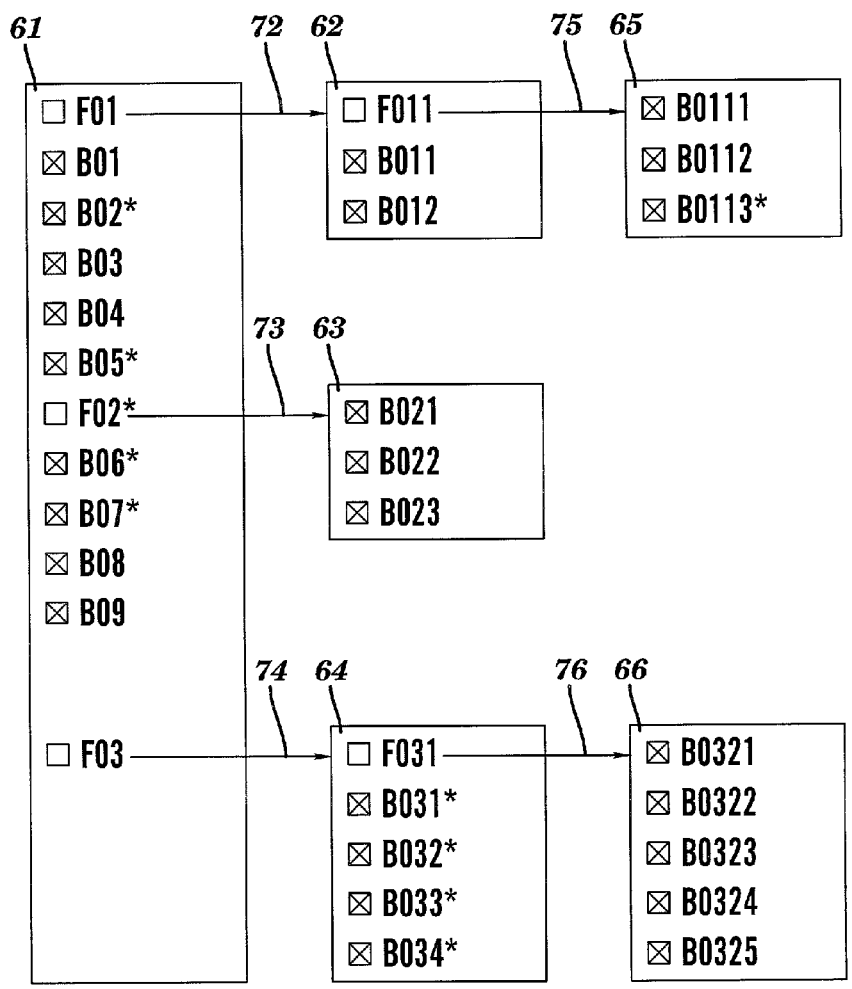
FIG. 8 is an example of a bookmark structure showing bookmarks to be searched, in accordance with embodiments of the present invention.

FIG. 8 illustrates a bookmark structure showing bookmarks selected to be searched. FIG. 8 shows a bookmark structure having a main bookmark list 61 (which is a bookmark folder) and bookmark folders 62–66, each such bookmark folder including bookmarks (beginning with the letter "B") and bookmark folders (beginning with the letter "F"). Thus B01, B02, ..., B011, B012, ..., B0325 are bookmarks. F01, F02, F03, F011, and F031 are bookmark folders further identified by reference numerals 62, 63, 64, 65, and 66 through pointers 72, 73, 74, 75, and 76, respectively. Thus FIG. 8 shows the following bookmark structure: the main bookmark list 61 includes folders F01, F02, and F03, and bookmarks B01, B02, B03, B04, B05, B06, B07, B08, and B09; the bookmark folder 62 (or F01) includes bookmark folder F011 and bookmarks B011 and B012; the bookmark folder 63 (or F02) includes bookmarks B021, B022, and B023; the bookmark folder 64 (or F03) includes bookmark folder F031 and bookmarks B031, B032, B033, and B034; the bookmark folder 65 (or F011) includes bookmarks B0111, B0112, and B0113; and the bookmark folder 66 (or F031) includes bookmarks B0321, B0322, B0323, B0324, and B0325. In FIG. 8, bookmarks tagged with an asterisk (*) identify bookmarks to be searched, and bookmark folders tagged with the asterisk (*) denote that all bookmarks in the asterisk-tagged bookmark folder are to be searched. For example, the bookmark folder F02 has been asterisk-tagged, which means that bookmarks B021, B022, and B023 in bookmark folder F02 are to be searched. Thus, bookmarks to be searched could be selected by individual bookmarks, by bookmark folder, or both. FIG. 9 illustrates the bookmark search list derived from the selected bookmarks of FIG. 8, and shows a total of 12 bookmarks to be searched (i.e., K=12). A "bookmark search list" is defined herein as including any manner of identifying which bookmarks in a bookmark structure are to be searched, such as, inter alia, the tagged bookmarks in FIG. 8 or the explicit list of bookmarks in FIG. 9. The scope of the present invention includes any method known to one of ordinary skill for selecting bookmarks to be searched, such as, inter alia, clicking or otherwise selecting bookmarks from a list or menu, typing text to denote bookmarks, etc. The bookmarks to be searched may be selected from a bookmark structure by, inter alia, a user at the client computer such as at the client 10 of FIG. 2.

The flow chart of FIG. 7 shows a loop through the K bookmarks to be searched, beginning at step 43 and ending at step 49. The loop uses a loop index i which takes on values of i=1, 2, ..., K corresponding to K passes (or iterations) through the loop. Iteration i performs a search for bookmark $B_i$. Step 42 initializes the loop index i to 0. Within the loop, step 43 steps the loop index i by 1, step 44 searches the bookmark $B_i$ to a depth N (N≧0) against an upgrade condition (to be explained infra), and step 45 determines whether the bookmark $B_i$ satisfies the upgrade condition. A depth N of a bookmark $B_i$ denotes all web pages N levels forward from the bookmark $B_i$, as explained supra in conjunction with FIG. 5. The depth N may be constant over the bookmarks on the bookmark search list, may be constant over the bookmarks on the bookmark search list for those bookmarks that are in the same bookmark folder of the bookmark structure, may be unique to one or more bookmarks on the bookmark search list, etc. Many alternatives exist for determining N such as, inter alia, user input, hard-coding of N into the conditional bookmark software, etc. N may be received by the conditional bookmark software from a client computer such as at the client 10 of FIG. 2, or at a computer that is remote to the client such as the server 20 of FIG. 2.

If the bookmark $B_i$ satisfies the upgrade condition, then step 46 moves the bookmark $B_i$ to a special bookmark location (SBL) if the bookmark $B_i$ is not already in the special bookmark location (i.e., if $B_i$ is already in the SBL it would be pointless to move $B_i$ to the SBL). The special bookmark location may be the main bookmark list or a bookmark folder of the bookmark structure. If the bookmark $B_i$ does not satisfy the upgrade condition, then the loop may execute steps 47–48. Steps 47–48 delete $B_i$ from the SBL if $B_i$ is in the SBL prior to execution of step 45, since $B_i$ should arguably not remain in the SBL if $B_i$ does not satisfy the upgrade condition. Alternatively, the conditional bookmark software associated with the flow chart of FIG. 7 may be programmed so as not to execute steps 47–48, on the assumption that the bookmark $B_i$ should not be removed from the SBL, after being previously placed in the SBL, for merely transiently failing to satisfy the upgrade condition. The loop ends with step 49, which determines whether the last bookmark ($B_K$) of the bookmark search list has been processed. If $B_K$ has been processed (i.e., if i=K) then the loop ends and the conditional book software stops executing; otherwise, the next loop iteration is executed beginning at step 43.

The upgrade condition includes any boolean text expression having logical operators such as AND, OR, NOT, etc. An example of a boolean text expression is "IBM OR ATT". For this example, step 45 of FIG. 7 determines whether the web page(s) associated with the bookmark $B_i$ (through depth N) includes "IBM" or "ATT". The upgrade condition may include, in addition to a boolean text expression, at least one of other conditions such as those conditions listed in Table 10, including: a client visitation condition, a general visitation condition, a bookmark existence condition, a content-type condition, a URL-age condition, and a Top-Level-Domain (TLD) condition.

A client visitation condition is any time constraint relating to visitation by a client or user to the web sites of the bookmark $B_i$ through depth N. An example of a client visitation condition is: none of the web sites of the bookmark $B_i$ through depth N were visited by the client or user in the past 30 days. Another example of a client visitation condition is: none of the web sites of the bookmark $B_i$ through depth N were visited by the client or user between the past 5 days and the past 20 days.

A general visitation condition is any time constraint relating to visitation by anyone to the web sites of the bookmark $B_i$ through depth N. An example of a general visitation condition is: none of the web sites of the bookmark $B_i$ through depth N were visited by anyone in the past 30 days. Another example of a general visitation condition is: none of the web sites of the bookmark $B_i$ through depth N were visited by anyone between the past 5 days and the past 20 days.

A bookmark existence condition is any time constraint relating to existence of the bookmark $B_i$ in a bookmark folder. An example of a bookmark existence condition is: the bookmark $B_i$ has been in the bookmark folder for no more than 5 days. Another example of a bookmark existence condition is: the bookmark $B_i$ has been in a bookmark folder for at least 15 days.

A content-type condition is a any constraint relating to content of a particular type in any of the web sites of the bookmark $B_i$ through depth N. Such content types may include, inter alia, Moving Picture Experts Group Audio Layer-3 (MP3) files/content, video clips, animation, sounds, pictures, tables, frames, etc. An example of a content-type condition is: the bookmark $B_i$ through depth N includes a MP3 file/content. Another example of a content-type condition is: the bookmark $B_i$ through depth N includes animation and does not include sounds.

A URL-age condition is any time constraint relating to the age or creation date of a URL page of the bookmark $B_i$ through depth N. A first example of a URL-age condition is: none of the web sites of the bookmark $B_i$ through depth N is more than 60 days old. A second example of a URL-age condition is: none of the web sites of the bookmark $B_i$ through depth N is less than 5 days old. A third example of a URL-age condition is: at least one of the web sites of the bookmark $B_i$ through depth N is existed prior to Jan. 20, 2001. A fourth example of a URL-age condition is: at least one of the web sites of the bookmark $B_i$ through depth N existed on Apr. 8, 1999.

A Top-Level-Domain (TLD) condition is any constraint on a TLD (e.g., .com, .net, .org, etc.) of the bookmark $B_i$ through depth N. An example of a TLD condition is: the bookmark $B_i$ through depth N includes a TLD of ".com" or ".org". Another example of a TLD condition is: the bookmark $B_i$ through depth N noes not include a TLD of ".com".

In summary, the upgrade condition used in step 45 of FIG. 7 includes a boolean text expression, and may also include at least one of: a client visitation condition, a general visitation condition, an existence condition, a content-type condition, a URL-age condition, and a Top-Level-Domain (TLD) condition. The upgrade condition may also include a depth N as described supra. As an example, the upgrade condition may include the boolean text expression, a client visitation condition to depth N, and a TLD, condition to depth N, wherein the boolean text expression, the client visitation condition, and the TLD condition must all be satisfied as a prerequisite to moving the bookmark $B_i$ to the SBL in accordance with step 46 of FIG. 7.

The preceding upgrade conditions may be unique to, or a function of, individual bookmarks or groups of bookmarks of the bookmark structure, or may be applied as a same condition or conditions for all bookmarks of the bookmark structure. As an example, the upgrade conditions may be bookmark folder dependent; i.e., a same upgrade condition(s) for all bookmarks in a given bookmark folder.

The method steps 40–49 of FIG. 7 may all be executed at a client computer such as the client 10 of FIG. 2, or at a computer that is remote to the client ("remote computer") such as at the server 20 of FIG. 2. As an alternative, some of the method steps 40–49 of FIG. 7 may be executed at a client computer such at the client 10 of FIG. 2, while other remaining steps of the method steps 40–49 may be executed at the remote computer such as at the server 20 of FIG. 2. As an example, the bookmark structure of step 40 may be provided at the client computer and the "generate" step 41 may be executed at the client computer, while steps 42–49 may be executed at the remote computer. A user at the client computer may trigger execution of software that implements some or all of the method steps 40–49. All of the preceding execution steps 40–49 of the flow chart of FIG. 7 (or portions thereof) may be executed by software, including the conditional bookmark software, or by a computer code or an algorithm of or within the software. The software components (or computer codes or algorithms thereof) associated with the flow chart of FIG. 7 may be: within the computer software 15 at the client 10 of FIG. 2, within the computer software 22 at the server 20 of FIG. 2, or distributed between both the computer software 15 and the computer software 22, depending on which of steps 40–49 of the flow chart of FIG. 7 are executed at the client and which of steps 40–49 are executed at the remote computer (e.g., remote server). The preceding data needed for executing the flow chart of FIG. 7 (e.g., the bookmark search list, the depth N, the upgrade condition(s), etc., may be included within the bookmark data 14 of the client 10 of FIG. 2 and/or the data 24 of the server 20 of FIG. 2. The upgrade condition may be supplied: by or at the client computer, or by or at the remote computer. Additionally, the upgrade condition may be in the form of user input, hard coded into the conditional bookmark software, etc.

Figure 11:
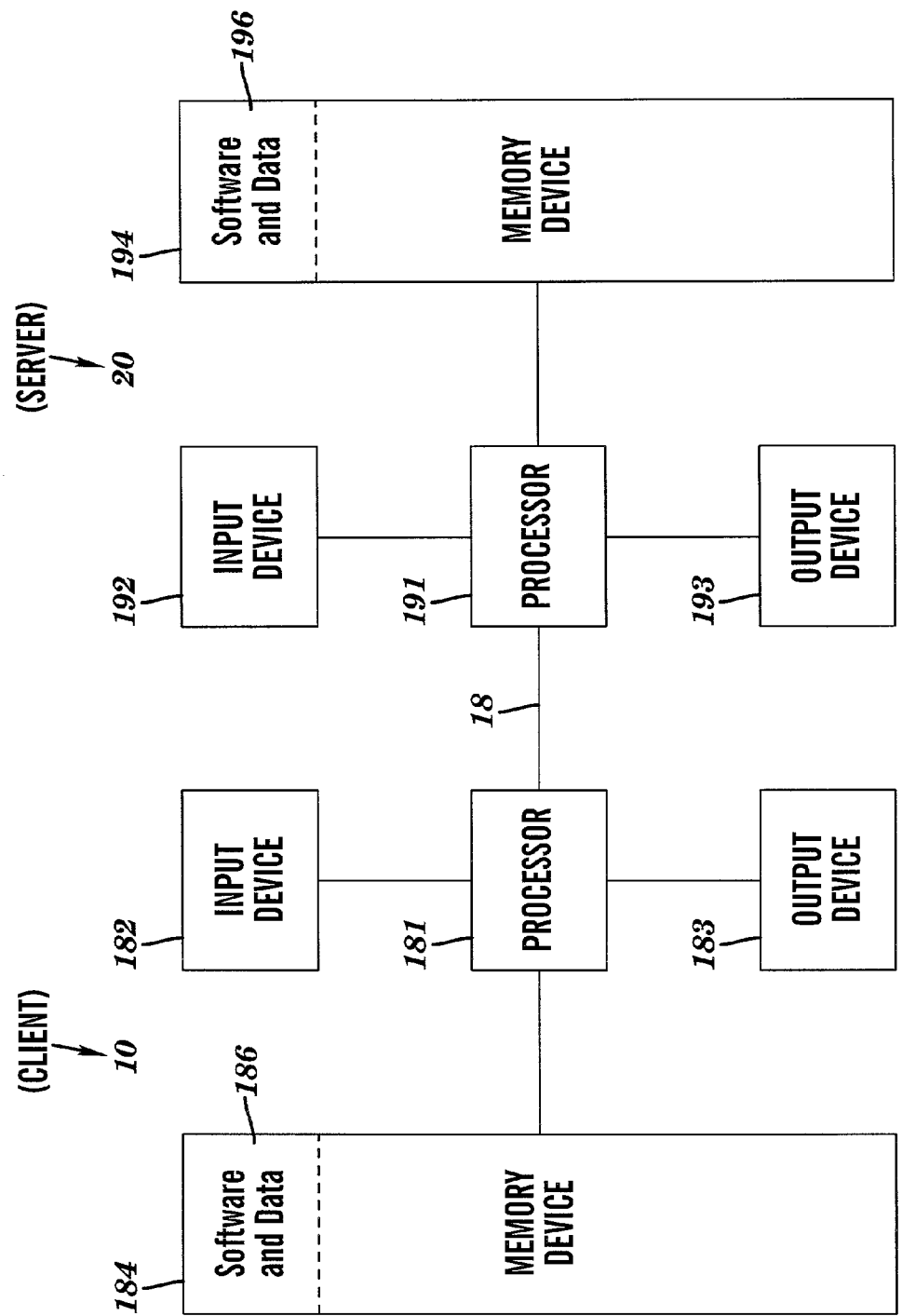
FIG. 11 depicts the client and server of FIG. 2 in further detail, in accordance with embodiments of the present invention.

FIG. 11 depicts the client 10 and server 20 of FIG. 2 in further detail, in accordance with embodiments of the present invention. The client 10 and the server 20 communicate over the interface 18 as described supra in conjunction FIG. 2.

The client 10 includes a processor 181, an input device 182 (representing at least one input device) coupled to the processor 181, an output device 183 (representing at least one output device) coupled to the processor 181, and a memory or storage device 184 (representing at least one memory or storage device) coupled to the processor 181. The input device 182 may be, inter alia, a keyboard, a mouse, etc. The output device 183 may be, inter alia, a printer, a plotter, a computer screen, a magnetic tape, a removable hard disk, a floppy disk, etc. The memory or storage device 184 may be, inter alia, a hard disk, an optical disk, a dynamic random access memory (DRAM), a read-only memory (ROM), etc. The memory or storage device 184 stores software and data 186 which comprises the browser 12, the bookmark structure 13, the bookmark data 14, and computer software 15, of the client 10 of FIG. 2. The processor 181 executes the computer software of the software and data 186. The data of the software and data 186 may include input data for computer software of the software and data 186. The output device 183 displays output from the software of the software and data 186. Additionally, the output device 183 may be used to display output, source code, graphics, etc.

The server 20 includes a processor 191, an input device 192 (representing at least one input device) coupled to the processor 191, an output device 193 (representing at least one output device) coupled to the processor 191, and a memory or storage device 194 (representing at least one memory or storage device) coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory or storage device 194 may be, inter alia, a hard disk, an optical disk, a dynamic random access memory (DRAM), a read-only memory (ROM), etc. The memory or storage device 194 comprises software and data 196, which includes the computer software 22 and data 24 of the server 20 of FIG. 2. The processor 191 executes the computer software of the software and data 196. The data of the software and data 196 may include input data for computer software of the software and data 196. The output device 193 displays output from the software of the software and data 19. Additionally, the output device 193 may be used to display output, source code, graphics, etc.

While FIG. 11 shows the client 10 coupled to the server 20 for a particular configuration of hardware and software, any configuration of hardware and software, as would be known to a person of ordinary skill in the art, may be utilized for the purposes stated supra in conjunction with the particular client 10 and server 20 of FIG. 11. For example, the browser 12, the bookmark structure 13, the bookmark data 14, and computer software 15, of the client 10 of FIG. 2, as included within the software and data 186 of FIG. 1, may be stored in the same memory or storage devices, or distributed into different memory or storage devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for organizing bookmarks, comprising:
searching each bookmark on a bookmark search list from depth 0 through depth N, wherein N is a positive integer, wherein the bookmark search list includes at least one bookmark in bookmark structure, wherein the bookmark structure includes a main bookmark list and at least one bookmark folder hierarchically linked to the main bookmark list, wherein the bookmark search list has K bookmarks therein, wherein K is a positive integer, and wherein the K bookmarks are denoted as $B_1, B_2, \ldots, B_K$; and
for each bookmark $B_i$ (i=1, 2, ... K):
determining from the searching whether the bookmark $B_i$ satisfies an upgrade condition that includes a boolean text expression; and
if the determining determines that the bookmark $B_i$ satisfies the upgrade condition, then moving the bookmark $B_i$ to a special bookmark location.

2. The method of claim 1, wherein the special bookmark location includes the main bookmark list.

3. The method of claim 1, wherein the special bookmark location includes a special bookmark folder of the at least one bookmark folder.

4. The method of claim 3, further comprising: if the determining determines that the bookmark $B_i$ does not satisfy the upgrade condition and if the bookmark $B_i$ is in the special bookmark location, then deleting the bookmark $B_i$ from the special bookmark location.

5. The method of claim 3, further comprising: if the determining determines that the bookmark $B_i$ does not satisfy the upgrade condition and if the bookmark $B_i$ is in the special bookmark location, then not deleting the bookmark $B_i$ from the special bookmark location.

6. The method of claim 1, wherein the at least one bookmark in the bookmark structure includes all bookmarks in a first bookmark folder of the at least one bookmark folder.

7. The method of claim 1, wherein the at least one bookmark in a bookmark structure includes at least one bookmark in a first bookmark folder of the at least one bookmark folder.

8. The method of claim 1, wherein the bookmark structure exists at a client computer, and wherein the searching, determining, and moving are executed at a computer that is remote to the client computer.

9. The method of claim 1, wherein the bookmark structure exists at a client computer, and wherein the searching, determining, and moving are executed at the client computer.

10. The method of claim 1, wherein K is at least 2.

11. The method of claim 1, wherein N is constant over the bookmarks on the bookmark search list.

12. The method of claim 1, wherein the upgrade condition further includes a client visitation condition.

13. The method of claim 1, wherein the upgrade condition further includes a general visitation condition.

14. The method of claim 1, wherein the upgrade condition further includes a bookmark existence condition.

15. The method of claim 1, wherein the upgrade condition further includes a content-type condition.

16. The method of claim 1, wherein the upgrade condition further includes a URL-age condition.

17. The method of claim 1, wherein the upgrade condition further includes a Top-Level-Domain (TLD) condition.

18. The method of claim 1, wherein the bookmark structure exists at a client computer, and wherein the upgrade condition is supplied by the client computer.

19. The method of claim 1, wherein the upgrade condition is bookmark folder dependent.

20. A method for organizing bookmarks, comprising:
generating a bookmark search list having K bookmarks therein, wherein the K bookmarks include at least one bookmark from a bookmark structure that includes a main bookmark list and at least one bookmark folder hierarchically linked to the main bookmark list, wherein K is a positive integer, and wherein the K bookmarks are denoted as $B_1, B_2, \ldots, B_K$; and
triggering execution of software that, for each bookmark $B_i$ (i=1, 2, ..., K):
searches the bookmark $B_i$ on the bookmark search list from depth 0 through depth N, wherein N is a positive integer,
determines from the searching whether the bookmark $B_i$ satisfies an upgrade condition that includes a boolean text expression, and
moves the bookmark $B_i$ to a special bookmark location within the bookmark structure if the software determines that the bookmark $B_i$ satisfies the upgrade condition.

21. The method of claim 20, wherein the special bookmark location includes the main bookmark list.

22. The method of claim 20, wherein the special bookmark location includes a special bookmark folder of the at least one bookmark folder.

23. The method of claim 22, wherein the software deletes the bookmark $B_i$ from the special bookmark location if the software determines that the bookmark $B_i$ does not satisfy the upgrade condition and that the bookmark $B_i$ is in the special bookmark location.

24. The method of claim 22, wherein the software does not delete the bookmark $B_i$ from the special bookmark location if the software determines that the bookmark $B_i$ does not satisfy the upgrade condition and if the bookmark $B_i$ is in the special bookmark location.

25. The method of claim 20, wherein the at least one bookmark in the bookmark structure includes all bookmarks in a first bookmark folder of the at least one bookmark folder.

26. The method of claim 20, wherein the at least one bookmark in a bookmark structure includes at least one bookmark in a first bookmark folder of the at least one bookmark folder.

27. The method of claim 20, wherein the bookmark structure exists at a client computer.

28. The method of claim 20, wherein K is at least 2.

29. The method of claim 20, wherein N is constant over the bookmarks on the bookmark search list.

30. The method of claim 20, wherein the upgrade condition further includes a client visitation condition.

31. The method of claim 20, wherein the upgrade condition further includes a general visitation condition.

32. The method of claim 20, wherein the upgrade condition further includes a bookmark existence condition.

33. The method of claim 20, wherein the upgrade condition further includes a content-type condition.

34. The method of claim 20, wherein the upgrade condition further includes a URL-age condition.

35. The method of claim 20, wherein the upgrade condition further includes a Top-Level-Domain (TLD) condition.

36. The method of claim 20, further comprising providing the upgrade condition.

37. The method of claim 20, wherein the upgrade condition is bookmark folder dependent.

38. A computer system for organizing bookmarks, said computer system comprising a computer code on a computer readable medium, said computer code adapted to:
search each bookmark on a bookmark search list from depth 0 through depth N, wherein N is a positive integer, wherein the bookmark search list includes at least one bookmark in a bookmark structure, wherein the bookmark structure includes a main bookmark list and at least one bookmark folder hierarchically linked to the main bookmark list, wherein the bookmark search list has K bookmarks therein, wherein K is a positive integer, and wherein the K bookmarks are denoted as $B_1, B_2, \ldots, B_K$; and
for each bookmark $B_i$ (i=1, 2, ... K):
determine from the searching whether the bookmark $B_i$ satisfies an upgrade condition that includes a boolean text expression; and
move the bookmark $B_i$ to a special bookmark location within the bookmark structure if the computer code determines that the bookmark $B_i$ satisfies the upgrade condition, wherein the special bookmark location is selected from the group consisting of the main bookmark list and a special bookmark folder of the at least one bookmark folder.

39. The computer system of claim 38, wherein the computer code is further adapted to delete the bookmark $B_i$ from the special bookmark location if the computer code determines that the bookmark $B_i$ does not satisfy the upgrade condition and if the bookmark $B_i$ is in the special bookmark location.

40. The computer system of claim 38, wherein the computer code is further adapted to not delete the bookmark $B_i$ from the special bookmark location if the computer code determines that the bookmark $B_i$ does not satisfy the upgrade condition and if the bookmark $B_i$ is in the special bookmark location.

41. The computer system of claim 38, wherein the computer system further comprises a client computer and a remote computer, wherein the bookmark structure exists at the client computer, and wherein the computer code is executed at the remote computer.

42. The computer system of claim 38, wherein the computer system further comprises a client computer, wherein the bookmark structure exists at the client computer.

43. The computer system of claim 38, wherein K is at least 2.

44. The computer system of claim 38, wherein N is constant over the bookmarks on the bookmark search list.

45. The computer system of claim 38, wherein the upgrade condition further includes at least one of a client visitation condition, a general visitation condition, a bookmark existence condition, a content-type condition, a URL-age condition, and a Top-Level-Domain (TLD) condition.

46. The computer system of claim 38, wherein the computer system further comprises a client computer, wherein the bookmark structure exists at the client computer, and wherein the upgrade condition is supplied by the client computer.

47. The computer system of claim 38, wherein the upgrade condition is bookmark folder dependent.

48. A computer system for organizing bookmarks, said computer system comprising a computer code on a computer readable medium, said computer code adapted to:
  generate a bookmark search list having K bookmarks therein, wherein the K bookmarks include at least one bookmark from a bookmark structure, wherein the bookmark structure includes a main bookmark list and at least one bookmark folder hierarchically linked to the main bookmark list, wherein K is a positive integer, and wherein the K bookmarks are denoted as $B_1, B_2, \ldots, B_K$; and
  trigger execution of software that, for each bookmark $B_i$ (i=1, 2, ... K):
    searches the bookmark $B_i$ on the bookmark search list from depth 0 through depth N, wherein N is a positive integer,
    determines from the searching whether the bookmark $B_i$ satisfies an upgrade condition that includes a boolean text expression, and
    moves the bookmark $B_i$ to a special bookmark location within the bookmark structure if the computer code determines that the bookmark $B_i$ satisfies the upgrade condition.

49. The computer system of claim 48, wherein the bookmark structure exists at a client computer.

50. The computer system of claim 48, wherein the bookmark structure exists at a client computer, and wherein the computer code is further adapted to having a user at the client computer select the at least one bookmark.

51. The computer system of claim 48, wherein the bookmark structure exists at a client computer, and wherein the computer code is further adapted to receiving N as input from a source that is external to the computer code.

52. The computer system of claim 48, wherein the bookmark structure exists at a client computer, and wherein the computer code is further adapted to receiving the upgrade condition as input from a source that is external to the computer code.

53. A system for organizing bookmarks, comprising:
  means for searching each bookmark on a bookmark search list from depth 0 through depth N, wherein N is a positive integer, wherein the bookmark search list includes at least one bookmark in a bookmark structure, wherein the bookmark structure includes a main bookmark list and at least one bookmark folder hierarchically linked to the main bookmark list, wherein the bookmark search list has K bookmarks therein, wherein K is a positive integer, and wherein the K bookmarks are denoted as $B_1, B_2, \ldots, B_K$; and
  for each bookmark $B_i$ (i=1, 2, ... K):
    means for determining from the searching whether the bookmark $B_i$ satisfies an upgrade condition that includes a boolean text expression; and
    means for moving the bookmark $B_i$ to a special bookmark location if the bookmark $B_i$ satisfies the upgrade condition.

54. The system of claim 53, further comprising means for deleting the bookmark $B_i$ from the special bookmark location if the bookmark $B_i$ does not satisfy the upgrade condition and if the bookmark $B_i$ is in the special bookmark location.

55. The system of claim 53, further comprising means for not deleting the bookmark $B_i$ from the special bookmark location if the bookmark $B_i$ does not satisfy the upgrade condition and if the bookmark $B_i$ is in the special bookmark location.

56. The system of claim 53, further comprising a client computer and a remote computer, wherein the bookmark structure exists at the client computer, and wherein the computer code is executed at the remote computer.

57. The system of claim 53, further comprising a client computer, wherein the bookmark structure exists at the client computer, and wherein the computer code is executed at the client computer.

58. The method of claim 53, wherein K is at least 2.

59. The system of claim 53, wherein N is constant over the bookmarks on the bookmark search list.

60. The system of claim 53, wherein the upgrade condition further includes at least one of a client visitation condition, a general visitation condition, a bookmark existence condition, a content-type condition, a URL-age condition, and a Top-Level-Domain (TLD) condition.

61. The system of claim 53, further comprising a client computer, wherein the bookmark structure exists at the client computer, and wherein the upgrade condition is supplied by the client.

62. The system of claim 53, wherein the upgrade condition is bookmark folder dependent.

63. A system for organizing bookmarks, comprising:
  means for generating a bookmark search list having K bookmarks therein, wherein the K bookmarks include at least one bookmark from a bookmark structure that includes a main bookmark list and at least one bookmark folder hierarchically linked to the main bookmark list, wherein K is a positive integer, and wherein the K bookmarks are denoted as $B_1, B_2, \ldots, B_K$; and
  means for triggering execution of software that, for each bookmark $B_i$ (i=1, 2, ... K):
    searches the bookmark $B_i$ on the bookmark search list from depth 0 through depth N, wherein N is a positive integer,
    determines from the searching whether the bookmark $B_i$ satisfies an upgrade condition that includes a boolean text expression, and
    moves the bookmark $B_i$ to a special bookmark location within the bookmark structure if the software determines that the bookmark $B_i$ satisfies the upgrade condition.

64. The system of claim 63, wherein the bookmark structure exists at a client.

65. The system of claim 63, wherein the bookmark structure exists at a client computer, and wherein the software is adapted to having a user at the client computer select the at least one bookmark.

66. The system of claim 63, wherein the bookmark structure exists at a client computer, and wherein the software is further adapted to receiving N as input from a source that is external to the computer code.

67. The system of claim 63, wherein the bookmark structure exists at a client computer, and wherein the software is adapted to receiving the upgrade condition as input from a source that is external to the software.

68. A computer program product, comprising a computer usable medium having a computer readable computer code embodied therein, wherein the computer code is adapted to:
    search bookmark on a bookmark search list from depth 0 through depth N, wherein N is a positive integer, wherein the bookmark search list includes at least one bookmark in a bookmark structure, and wherein the bookmark structure includes a main bookmark list and at least one bookmark folder hierarchically linked to the main bookmark list, wherein the bookmark search list has K bookmarks therein, wherein K is a positive integer, and wherein the K bookmarks are denoted as $B_1, B_2, \ldots, B_K$; and
    for each bookmark $B_i$ (i=1, 2, ... K):
        determine from the searching whether the bookmark $B_i$ satisfies an upgrade condition that includes a boolean text expression; and
        move the bookmark $B_i$ to a special bookmark location within the bookmark structure if the computer code determines that the bookmark $B_i$ satisfies the upgrade condition, wherein the special bookmark location is selected from the group consisting of the main bookmark list and a special bookmark folder of the at least one bookmark folder.

69. A computer program product, comprising a computer usable medium having a computer readable computer code embodied therein, wherein the computer code is adapted to:
    generate a bookmark search list having K bookmarks therein, wherein the K bookmarks include at least one bookmark from a bookmark structure that includes a main bookmark list and at least one bookmark folder hierarchically linked to the main bookmark list, wherein K is a positive integer, and wherein the K bookmarks are denoted as $B_1, B_2, \ldots, B_K$; and
    trigger execution of software that, for each bookmark $B_i$ (i=1, 2, ... K):
        searches the bookmark $B_i$ on the bookmark search list from depth 0 through depth N, wherein N is a positive integer,
        determines from the searching whether the bookmark $B_i$ satisfies an upgrade condition that includes a boolean text expression, and
        moves the bookmark $B_i$ to a special bookmark location within the bookmark structure if the computer code determines that the bookmark $B_i$ satisfies the upgrade condition.

70. The computer system of claim 48, wherein K is at least 2.

71. The system of claim 53, wherein K is at least 2.

72. The system of claim 63, wherein K is at least 2.

* * * * *